(12) United States Patent
Xue

(10) Patent No.: US 11,635,629 B2
(45) Date of Patent: Apr. 25, 2023

(54) HEAD-MOUNTED DISPLAY DEVICE AND BINDING BAND ADJUSTING DEVICE THEREOF

(71) Applicant: GOERTEK INC., Shandong (CN)

(72) Inventor: Yuan Xue, Shandong (CN)

(73) Assignee: GOERTEK INC., Weifang (CN)

( * ) Notice: Subject to any disclaimer, the term of this patent is extended or adjusted under 35 U.S.C. 154(b) by 140 days.

(21) Appl. No.: 17/291,133

(22) PCT Filed: Dec. 28, 2018

(86) PCT No.: PCT/CN2018/124600
§ 371 (c)(1),
(2) Date: May 4, 2021

(87) PCT Pub. No.: WO2020/093561
PCT Pub. Date: May 14, 2020

(65) Prior Publication Data
US 2021/0389594 A1 Dec. 16, 2021

(30) Foreign Application Priority Data

Nov. 7, 2018 (CN) .......................... 201811320239.1

(51) Int. Cl.
*G02B 27/01* (2006.01)
(52) U.S. Cl.
CPC .. *G02B 27/0176* (2013.01); *G02B 2027/0154* (2013.01)
(58) Field of Classification Search
CPC ................... G02B 27/0176; G02B 2027/0154
See application file for complete search history.

(56) References Cited

U.S. PATENT DOCUMENTS 5,373,588 A * 12/1994 Hede ...................... A42B 3/145
2/418
2018/0364490 A1 12/2018 Lin et al.

FOREIGN PATENT DOCUMENTS

| CN | 103067809 | 4/2013 |
| CN | 204883054 | 12/2015 |
| CN | 205594231 | 9/2016 |
| CN | 206930840 | 1/2018 |

(Continued)

OTHER PUBLICATIONS

International Search Report issued in PCT/CN2018/124600 dated Aug. 9, 2019.

*Primary Examiner* — Kwang-Su Yang
(74) *Attorney, Agent, or Firm* — Workman Nydegger

(57) ABSTRACT

A binding band adjusting device and a head-mounted display device having the binding band adjusting device are provided. The binding band adjusting device includes a support assembly provided with a through hole, a rotating assembly matching the through hole, two side binding bands connected to the rotating assembly, a trigger assembly disposed on the support assembly and used for being triggered by the rotating assembly, and a front-back binding band that can fix with respect to the trigger assembly; when the rotating assembly rotates in different directions with respect to the through hole, the two side binding bands expand and contract with respect to the support assembly; when the rotating assembly moves in the axial direction of the through hole and triggers the trigger assembly, the trigger assembly loosens or clamps the front-back binding band.

20 Claims, 7 Drawing Sheets

(56) References Cited

FOREIGN PATENT DOCUMENTS

| | | |
|---|---|---|
| CN | 206960774 | 2/2018 |
| CN | 108205202 | 6/2018 |
| TW | I632871 | 8/2018 |

* cited by examiner

HEAD-MOUNTED DISPLAY DEVICE AND BINDING BAND ADJUSTING DEVICE THEREOF

The present application is a 371 Application of International Patent Application No. PCT/CN2018/124600, filed Dec. 28, 2018, which claims the priority to Chinese Patent Application No. 201811320239.1, titled "HEAD-WORN DISPLAY DEVICE AND BINDING BAND ADJUSTING DEVICE THEREOF", filed with the China National Intellectual Property Administration on Nov. 7, 2018, which are incorporated herein by reference in their entireties entirety.

FIELD

The present application relates to the technical field of head-worn display devices, and in particular to a head-worn display device and binding band adjusting device thereof.

BACKGROUND

At present, with the continuous progress of science and technology, smart wearable devices are getting more and more popular, among which VR (virtual reality) devices are popular products in the market.

Current VR devices are often worn on the head, and its tightness may be adjusted, so that the VR devices are suitable for people with different head sizes. Specifically, a VR device usually includes side binding bands and front and back binding bands. The side binding bands fit two sides of the head, and the front and back binding bands fit the top of the head, so as to realize the securing of the VR device on the head.

In the conventional technology, the side binding bands and the front and back binding bands of the VR device are independent of each other, and often only one of the side binding bands and the front and back binding bands may be adjusted; that is, the side binding bands usually may not be adjusted, but only the front and back binding bands can be adjusted; or the front and back binding bands may not be adjusted, but only the side binding bands may be adjusted. As a result, when the user wears the VR device, the tightness of different positions of the head may not be adjusted more comfortably, so that the VR device may not be more widely applicable to different groups of people.

In summary, how to provide a binding band adjusting device having a wider application range is a technical problem that those skilled in the art need to think about.

SUMMARY

An object of the present application is to provide a head-worn display device and binding band adjusting device thereof, and the binding band adjusting device has a wider application range and is relatively comfortable for users to wear.

In order to achieve the above object, the present application provides a binding band adjusting device, which includes a supporting component provided with a through hole, a rotating component matched with the through hole, two side binding bands connected with the rotating component, a triggering component arranged on the supporting component for being triggered by the rotating component, and a front and back binding band which may be secured relative to the triggering component;

if the rotating component rotates in different directions relative to the through hole, the two side binding bands extend or retract relative to the supporting component;

if the rotating component moves in the axial direction of the through hole and triggers the triggering component, the triggering component loosens or clamps the front and back binding band.

Preferably, the triggering component includes:

an induction part used for contacting with the rotating component;

an fitting part for tightly fitting the front and back binding band to clamp the front and back binding band;

an executing part connected with the induction part and the fitting part and used for controlling the fitting part to loosen or clamp the front and back binding band after the induction part is triggered by the rotating component.

Preferably, the fitting part includes a pressing plate close to the supporting component and a pressing cover far away from the supporting component, one end of the front and back binding band is located between the pressing plate and the pressing cover, and a clamping force is provided between the pressing plate and the pressing cover for clamping the front and back binding band.

Preferably, the induction part is specifically a pressure sensor, the executing part includes an electromagnet, and the pressing plate is specifically a metal pressing plate which may be attracted by the electromagnet to loosen the front and back binding band;

if the pressure sensor receives the pressure of the rotating component, the pressure sensor sends out a pressure signal to allow the electromagnet to generate magnetism, the metal pressing plate is attracted by the electromagnet and moves towards the electromagnet, and the metal pressing plate loosens the front and back binding band.

Preferably, the induction part is specifically a pressure sensor, the executing part includes an electromagnet and a magnet which may be attracted by the electromagnet, the pressing plate is specifically a plastic pressing plate, and the magnet is provided on the plastic pressing plate;

if the pressure sensor receives the pressure of the rotating component, the pressure sensor sends out a pressure signal to allow the electromagnet to generate magnetism, the magnet is attracted by the electromagnet, both the magnet and the plastic pressing plate move towards the electromagnet, and the metal pressing plate loosens the front and back binding band.

Preferably, the rotating component includes a knob and a gear for rotating under the rotation of the knob, and the two side binding bands are provided with teeth for meshing with the gear;

if the knob is rotated in different directions, the two side binding bands and the gear move synchronously, and the two side binding bands extend or retract relative to the supporting component.

Preferably, the knob includes an annular body, a rotating shaft and a mounting shaft which are arranged inside the annular body and extend along the axial direction of the through hole, one end, close to the supporting component, of the rotating shaft is used for triggering the triggering component, the mounting shaft is arranged outside the circumference of the rotating shaft, and one end, close to the supporting component, of the mounting shaft is provided with a claw for clamping the supporting component; the gear is provided with a mounting through hole for mounting the mounting shaft.

Preferably, the knob further includes a circumferential stopper arranged between the mounting shaft and the annular body; an end face, far away from the front and back binding band, of the gear is fixedly provided with a clamping arm which is matched with the circumferential stopper, so as to drive the gear to rotate under the rotating action of the knob.

Preferably, the clamping arm is provided with a first matching part, the supporting component is provided with a second matching part for matching with the first matching part, and the first matching part may rotate unidirectionally relative to the second matching part;

if the knob drives the gear to rotate in a first direction, friction is generated between the first matching part and the second matching part;

if the knob drives the gear to rotate in a second direction, the first matching part and the second matching part are out of contact.

Preferably, the knob further includes a first annular part arranged inside the annular body, the supporting component is provided with a second annular part matched with the first annular part, so that if the rotating shaft triggers the triggering component, the first annular part and the second annular part are matched with each other to prevent the knob from rotating relative to the supporting component. Preferably, the supporting component is provided with a retaining ring located in the circumferential direction of the through hole, the second annular part and the second matching part are located at one side, away from the two side binding bands, of the retaining ring, and the gear is located at one side, near the two side binding bands, of the retaining ring.

Preferably, the supporting component includes a back cover, a first bracket connected with the back cover to form an accommodating cavity for accommodating the two side binding bands, and a second bracket connected with the first bracket for mounting the triggering component; the back cover is provided with a second annular part, a second matching part and a retaining ring. The back cover, the first bracket and the second bracket are provided with via holes for forming the through hole.

Preferably, the rotating shaft is longer than the claw, and the claw is used to clamp the via hole of the first bracket.

Preferably, an elastic washer is provided in the circumferential direction of the second annular part, and the elastic washer is located between the annular body and the supporting component.

Preferably, the binding band adjusting device further includes a limit washer arranged between the first bracket and the second bracket and used for fixing the relative positions of the first bracket and the second bracket.

Preferably, the binding band adjusting device further includes an elastic layer arranged on the back cover and used for accommodating the first bracket, the second bracket and the triggering component.

A head-worn display device is further provided according to the present application, including the binding band adjusting device described in any one of the above.

Compared with the above-mentioned background technology, the binding band adjusting device provided by the present application includes the supporting component, the rotating component, the triggering component, the front and back binding band, and the two side binding bands, the supporting component is provided with the through hole, and the rotating component may rotate relative to the through hole, and the rotating component may also move in the axial direction of the through hole; the rotating component is connected to the two side binding bands. If the rotating component rotates, the two side binding bands extend or retract relative to the supporting component; the triggering component is used to secure the front and back binding band, and the triggering component is triggered by the rotating component; if the front and back binding band needs to be adjusted, the rotating component is controlled to move in the axial direction of the through hole. Once the triggering component is triggered by the rotating component, the triggering component loosens the front and back binding band and adjusts the positional relationship between the front and back binding band relative to the supporting component. Taking the binding band adjusting device worn on the head as an example, the two side binding bands are used to fit the two sides of the head, and the front and back binding bands are used to fit the top of the head. With this arrangement, the adjustment of the two side binding bands and the front and back binding band may be completed by using the above two different operating modes of the rotating component; the first type: if the rotating component rotates relative to the through hole, the position of the two side binding bands relative to the supporting component may be adjusted, the second type: the rotating component moves in the axial direction of the through hole, which may adjust the position of the front and back binding band relative to the supporting component. It may be seen that the position adjustment of the two side binding bands and the front and back binding band relative to the supporting component may be completed only by controlling the operation mode of the rotating component, which greatly simplifies the adjustment process, makes the adjustment process simple and fast, and the setting mode of the binding band adjusting device is relatively simple, which is helpful to reduce the production cost and improve the product competitiveness.

The present application further provides a head-worn display device with the above-mentioned beneficial effects, which will not be repeated here.

BRIEF DESCRIPTION OF THE DRAWINGS

For more clearly illustrating embodiments of the present application or the technical solutions in the conventional technology, drawings to be used in the description of the embodiments or the conventional technology will be briefly described hereinafter. Apparently, the drawings in the following description are only some embodiments of the present application. For those skilled in the art, other drawings may be obtained based on the provided drawings without any creative work.

DETAILED DESCRIPTION OF THE EMBODIMENTS

Figure 1:
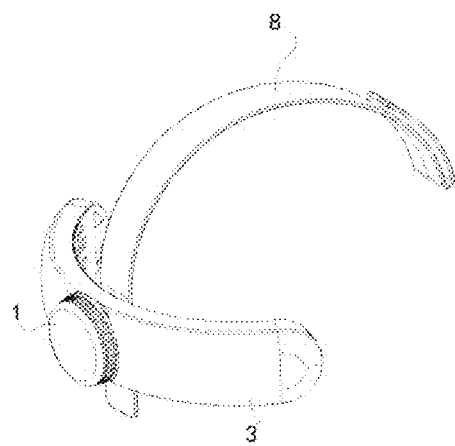
FIG. 1 is a schematic diagram of the overall structure of a binding band adjusting device provided by an embodiment of the present application.

Technical solutions of embodiments of the present application are clearly and completely described hereinafter in conjunction with the drawings of the embodiments of the present application. Apparently, the embodiments described in the following are only some embodiments of the present application, rather than all embodiments. Based on the embodiments of the present disclosure, all of other embodiments, made by those skilled in the art without any creative efforts, fall into the scope of protection of the present disclosure.

In order to provide the person skilled in the art with a better understanding of the solution of the present application, the present application is described hereinafter in further detail in conjunction with the drawings and embodiments.

It should be noted in advance that "located on . . . " mentioned in this specification does not mean that a certain component is located above another component, that is, there is no position-limited relationship between two components, but only indicates the connection relationship between two components; in other words, the "on" in "located on . . . " is an auxiliary word in modern Chinese, which is a special function word with no real meaning. It does not reflect the positional relationship, but only exists for the smoothness of the sentence.

A binding band adjusting device provided by the present application includes a supporting component, a rotating component, a triggering component, a front and back binding band 8 and two side binding bands 4, as shown in FIG. 1 to FIG. 5 and FIG. 11 of the specification.

The supporting component is provided with a through hole, and the supporting component may be in an arc shape; for different wearing positions, the supporting component of the binding band adjusting device may fit different parts of a human body, for example, a head, or body parts such as a wrist or an arm; for convenience of description, the following description takes the binding band adjusting device worn on the head as an example; of course, this does not mean that the binding band adjusting device can only wear on the head; if the binding band adjusting device is worn on other parts of the human body, the front and back binding band 8 and the two side binding bands 4 may fit different parts of the human body according to actual needs, which will not be described in detail later.

The rotating component is matched with the through hole of the supporting component, specifically, the rotating component may rotate relative to the through hole, and the rotating component may also move in an axial direction of the through hole; that is, there are two operating modes for the rotating component relative to the supporting component, the first type: the rotating component rotates relative to the through hole, that is, the rotating component rotates relative to the through hole and the supporting component; the second type: the rotating component moves in an axial direction of the through hole, and it may regarded as the rotating component approaching or going away from the through hole and the supporting component.

The supporting component may be regarded as the installation reference of the binding band adjusting device, and the rotating component, the triggering component, the front and back binding band 8 and the two side binding bands 4 are all installed on the supporting component. The shape and structure of the front and back binding band 8 may refer to the FIG. 1 to FIG. 4 of the specification. The front and back binding band 8 is arc-shaped, with two low ends and a high middle part. One end of the front and back binding band 8 is secured relative to the supporting component, and another end of the front and back binding band 8 is suspended; the front and back binding band 8 should have a certain degree of elasticity for fitting the top of the head. The general shape and structure of the two side binding bands 4 may refer to FIG. 11 of the specification. The two side binding bands 4 are respectively located on both sides of the head. The two side binding bands 4 are independent of each other and are not directly connected with each other. The two side binding bands 4 should have a certain degree of elasticity for fitting both sides of the head; the two side binding bands 4 are installed on the supporting component, and the two side binding bands 4 may be fixed in position relative to the supporting component, and the supporting component is used for fitting the head. The front and back binding band 8, the supporting component, and the two side binding bands 4 respectively fit different positions of the head, so as to allow the binding band adjusting device to be worn on the head. The specific shape and structure of the supporting component may be determined according to actual needs, for example, it is configured as a cavity or the like. A specific embodiment will be given below.

The rotating component is connected to the two side binding bands 4, in the first operation mode of the rotating component, if the rotating component rotates in different directions relative to the through hole, the two side binding bands 4 extend or retract relative to the supporting component to adjust the force applied to the head; specifically, if the rotating component rotates in the first direction relative to the through hole, the two side binding bands 4 extend relative to the supporting component; apparently, if the rotating component rotates in the second direction relative to the through hole, the two side binding bands 4 retract relative to the supporting component, and the first direction is opposite to the second direction, and the first direction may be clockwise, while the second direction should be counterclockwise; if the first direction is counterclockwise, the second direction should be clockwise.

Figure 2:
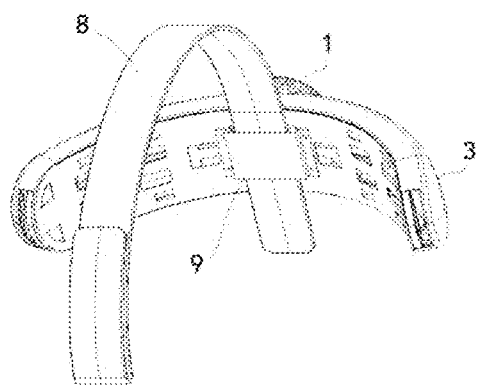
FIG. 2 is a schematic diagram of the binding band adjusting device in FIG. 1 from another angle.
Figure 3:
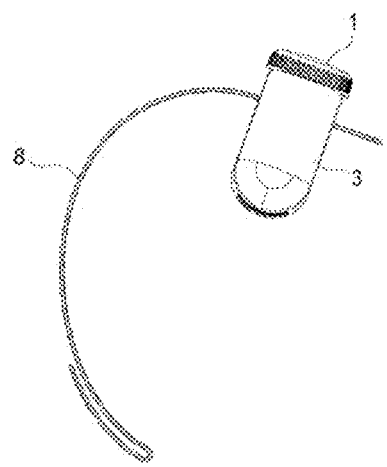
FIG. 3 is a side view of the binding band adjusting device in FIG. 2.
Figure 11:
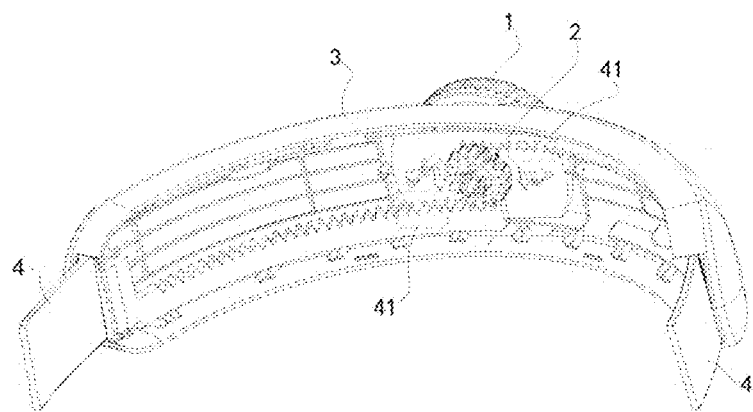
FIG. 11 is a schematic diagram of the knob, the gear, the clamping arm, the back cover and the side binding bands in FIG. 4 after matching.

FIG. 11 of the specification shows a connection mode of a rotating component and two side binding bands 4. The rotating component includes a knob 1 and a gear 2. The knob 1 is located outside the supporting component and on a side, far from the head, of the supporting component for hand adjustment; the gear 2 and the two side binding bands 4 are closer to the head than to the knob 1. With reference to FIG. 1 to FIG. 3 of the specification, the gear 2 and the two side binding bands 4 may be wrapped by the supporting component, or the gear 2 and the two side binding bands 4 are located on a side, close to the head, of the supporting component. Regardless of the arrangement, only the knob 1 is exposed on an outer side (the side away from the head) of the supporting component.

The knob 1 and the gear 2 rotate synchronously, and the knob and the gear may be connected by a secured method such as bolts in the conventional technology. If the knob 1 is rotated by a hand, the knob 1 and the gear 2 rotate synchronously; the two side binding bands 4 are provided with teeth 41, and the gear 2 meshes with the teeth 41 of the two side binding bands 4, and the teeth 41 of the two side binding bands 4 are respectively located on two radial sides of the gear 2; when the gear 2 rotates in different directions, the two side binding bands 4 extend and retract relative to the supporting component. In FIG. 11 of the specification, if the knob 1 rotates counterclockwise, the gear 2 rotates counterclockwise. At this time, the teeth 41 of the left side binding band 4 move to the right, and the left side binding band 4 retracts relative to the supporting component; the teeth 41 of the side binding band 4 at the right end move to the left, and the side binding band 4 at the right end retracts relative to the supporting component; similarly, if the knob 1 rotates in the clockwise direction, the two side binding bands 4 extend relative to the supporting component. The specific movement process is similar to the above, and will not be repeated here.

The above only gives a connection method of the rotating component and the two side binding bands 4, those skilled in the art may know that, in order to realize the conversion of rotational movement into horizontal movement (the rotational movement of the rotating component is converted into the horizontal movement of the two side binding bands 4), there are many alternative mechanisms, such as worm gear, screw mechanism and connecting rod structure, etc., which is not expanded in this specification.

In the second operating mode of the above-mentioned rotating component, the rotating component moves in the axial direction relative to the through hole of the supporting component, the triggering component is triggered by the rotating component moving in the axial direction, so that the triggering component loosens or clamps the front and back binding band 8 and adjusts the tension applied to the front and back of the head, that is, adjusts the tightness of the front and back of the head.

Specifically, the supporting component is provided with the triggering component, the triggering component may be wrapped by the supporting component, or the triggering component is located on the side, close to the head, of the supporting component, and the triggering component is used for securing the front and back binding band 8; the front and back binding band 8 may be secured on an inner side (the side attached to the head) of the supporting component, and the securing between the front and back binding band 8 and the supporting component is realized by the triggering component; if the triggering component is not triggered by the rotating component, the triggering component maintains the clamping of the front and back binding band 8, and the front and back binding band 8 is secured in position relative to the triggering component and the supporting component, so that the binding band adjusting device may be worn on the head; if the triggering component is triggered by the rotating component, the triggering component loosens the front and back binding band 8, at this time, the front and back binding band 8 may be displaced relative to the triggering component and the supporting component to adjust the tightness of the front and back of the head; of course, if the triggering component is triggered by the rotating component, the triggering component moves relative to the supporting component, so as to realize the loose of the front and back binding band 8 by the triggering component.

In the above process, that pressing the rotating component may be used as a condition for loosening the front and back binding band 8, and may also be used as a condition for clamping the front and back binding band 8; of course, correspondingly, if pressing down the rotating component may realize that the triggering component loosens the front and back binding band 8, in order to realize that the triggering component clamps the front and back binding band 8, it is necessary to move the rotating component towards an outside of the supporting component. Similarly, if pressing down the rotating component may realize that the triggering component clamps the front and back binding band 8, in order to realize that the triggering component loosens the front and back binding band 8, it is necessary to move the rotating component towards the outside of the supporting component.

Based on practical considerations, the following takes "pressing down the rotating component to realize the triggering component to loosen the front and back binding band 8" as an example. That is, if the rotating component is not touched, the triggering component should maintain the clamping of the front and back binding band 8. Only if the rotating component is pressed down, can the position of the front and back binding band 8 relative to the supporting component be adjusted, which achieves tightness with respect to the head at the front and back. However, this specification also protects the technical solution of "pressing down the rotating component to realize the triggering component to clamp the front and back binding band 8", but this specification does not expand only because the solution is similar to the above.

The rotating component may be provided with an electronic button, and the triggering component may be set as a clamping jaw controlled by the electronic button to clamp and loosen; if the rotating component is not pressed, the triggering component is not triggered by the electronic button. At this time, the triggering component maintains an initial state, and the initial state of the triggering component may be set to the state that the front and back binding band 8 is clamped; if the rotating component is pressed down and moves in the axial direction of the through hole, once the electronic button of the rotating component touches the triggering component, the triggering component loosens its jaws, and the front and back binding band 8 may move relative to the supporting component, thereby adjusting the tightness with respect to the head at the front and back; after the position adjusting of the front and back binding band 8 relative to the supporting component is completed, the rotating component is loosened, at this time, the rotating component may return to its original position under the action of elastic components such as a spring, so that the electronic button and the triggering component are separated. The triggering component that is not touched by the electronic button is kept in a clamped state, and the front and back binding band 8 is clamped, so that the front and back binding band 8 is maintained in the adjusted position.

Of course, other specific setting manners for the rotating component and the triggering component may be provided, and one specific implementation manner is given below.

Figure 4:
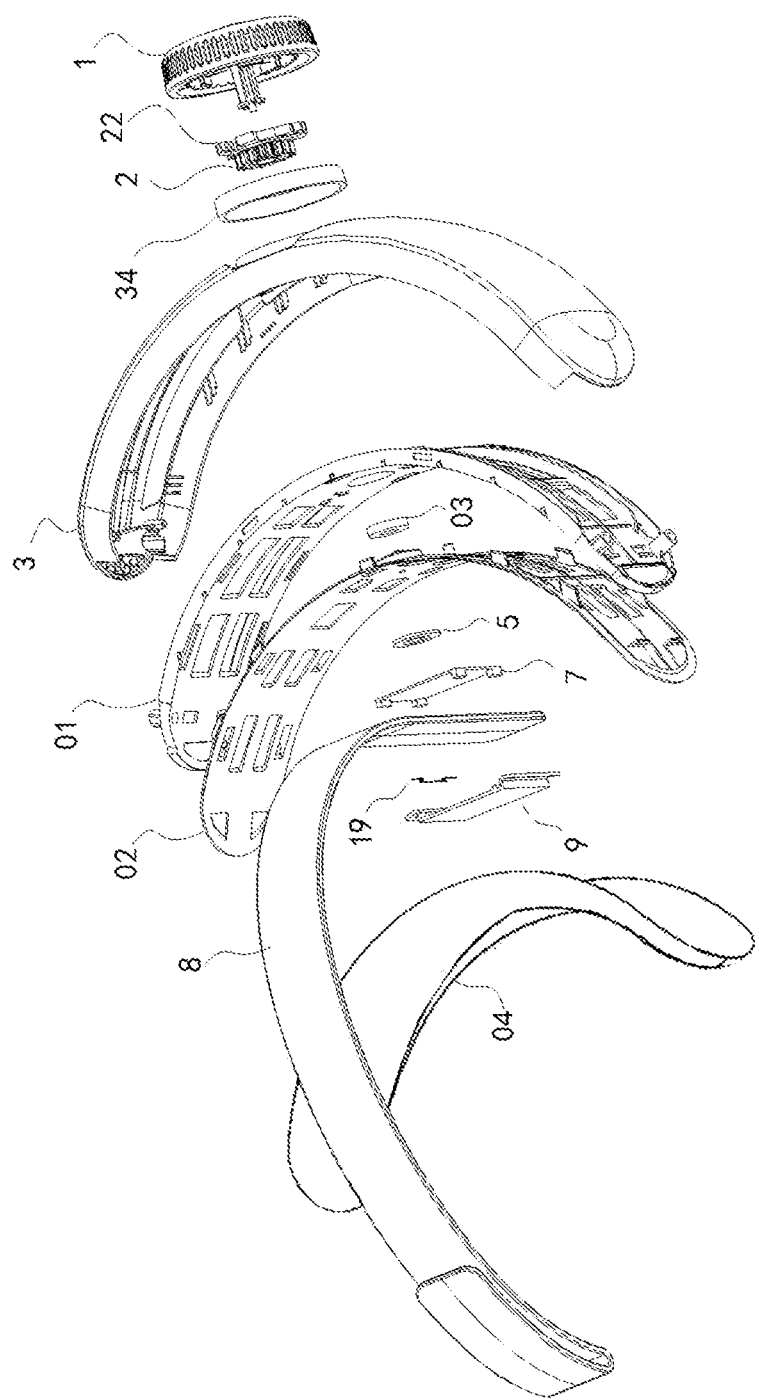
FIG. 4 is an exploded view of other components in FIG. 1 except for the side binding bands.
Figure 5:
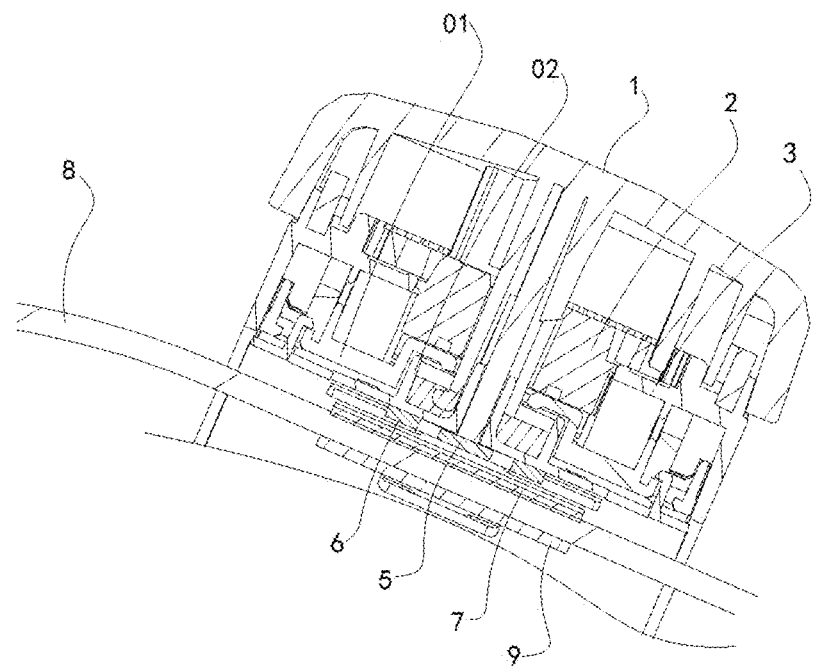
FIG. 5 is a schematic cross-sectional view of the binding band adjusting device in FIG. 3.

Referring to FIG. 4 and FIG. 5 of the specification, the triggering component includes an induction part 5, a fitting part and an executing part. The position of the induction part 5 relative to the supporting component is fixed, and the induction part 5 and the supporting component may be fixedly connected by means of adhesives in the conventional technology.

For the situation of "pressing down the rotating component to realize the triggering component to loosen the front and back binding band 8", if the triggering component clamps the front and back binding band 8, there is a certain gap between the induction part 5 and the rotating component, and there is no contact between the induction part and the rotating part, that is, the induction part 5 is not triggered by the rotating component; if it needs to adjust the positional relationship of the front and back binding band 8 relative to the supporting component, the rotating component moves in an axial direction of the through hole, and the rotating component gradually approaches the induction part 5, and when the rotating component contacts the induction part 5, the induction part 5 is triggered.

The fitting part is used for clamping the front and back binding band 8. Refer to the FIG. 1 to FIG. 3 of the specification, the front and back binding band 8 have two ends, the fitting part is used for clamping one end of the front and back binding band 8, and another end of the front and back binding band 8 is suspended. The front and back binding band 8 has a front surface and a back surface. The front surface of the front and back binding band 8 is far away from the head and does not fit the head, and the back surface of the front and back binding band 8 fits the head. The fitting part clamps the front and back binding band 8, that is, the front and back surfaces of the front and back binding band 8 respectively fit different positions or parts of the fitting part, so that the front and back binding band 8 is located within the fitting part and the fitting part clamps the front and back binding band 8.

There is a connection relationship between the executing part and the induction part 5, and the connection may be electrical or mechanical, etc.; there is also a connection relationship between the executing part and the fitting part, and the two may also be electrically connected or mechanically connected. If the induction part 5 is triggered by the rotating component, the executing part controls the fitting part to loosen or clamp the front and back binding band 8.

As mentioned above, this specification takes the example of pressing the rotating component to realize the triggering component to loosen the front and back binding band 8 as an example. That is, the following description continues according to "if the induction part 5 is triggered by the rotating component, the executing part controls the fitting part to loosen the front and back binding band 8".

The induction part 5 may be set as a control button, the fitting part may be set as two clamping plates, the two clamping plates are respectively located on the front and back of the front and back binding band 8, and the executing part may be set as an executing mechanism such as a control motor for controlling the movement of the two clamping plates.

If the two clamping plates clamp the front and back binding band 8, the control button is not triggered by the rotating component, and the two clamping plates keep the clamping state continuously, so as to keep the position of the front and back binding band 8 relative to the supporting component; if it needs to adjust the positional relationship of the front and back binding band 8 relative to the supporting component, the rotating component moves in the axial direction of the through hole, the control button is triggered by the rotating component, and then the control button sends a signal to the executing mechanism, the executing mechanism starts to operate after receiving the signal. Since the executing mechanism is connected to the two clamping plates, and the operation of the executing mechanism causes the two clamping plates to move toward each other, the front and back binding band 8 is loosened, and the front and back binding band 8 may adjust the position relative to the supporting component. After the adjustment of the front and back binding band 8 is completed, the rotating component may be controlled to move away from the control button. After the rotating component and the control button are out of contact, the control button stops sending a signal to the executing mechanism, and the executing mechanism that has not received the signal moves to the initial state. The two clamping plates realize the clamping of the front and back binding band 8 when the executing mechanism moves to the initial state.

Of course, other specific arrangement of the above-mentioned induction part 5, fitting part and executing part may also be provided, which is described in detail below.

With reference to FIG. 4, FIG. 5, FIG. 12 and FIG. 13 of the specification, the fitting part includes a pressing plate 7 and a pressing cover 9. The pressing plate 7 is close to the supporting component and the pressing cover 9 is far away from the supporting component; the pressing plate 7 fits the front surface of the front and back binding band 8, and the pressing cover 9 fits the back surface of the front and back binding band 8.

There is a clamping force between the pressing plate 7 and the pressing cover 9 to clamp the front and back binding band 8. Both the pressing plate 7 and the pressing cover 9 are generally plate-shaped, and the specific shapes and structures of the pressing plate 7 and the pressing cover 9 may be determined according to actual needs.

If the pressing plate 7 and the pressing cover 9 clamp the front and back binding band 8, the position of the front and back binding band 8 relative to the supporting component is secured; if the position of the front and back binding band 8 relative to the supporting component needs to be adjusted, the induction part 5 is triggered by the rotating component, and the induction part 5 sends a signal to the executing part. On the premise of overcoming the clamping force between the pressing plate 7 and the pressing cover 9, the executing part controls the pressing plate 7 and the pressing cover 9 to move towards each other, and the pressing plate 7 and the pressing cover 9 loosen the front and back binding band 8, so that the position of the front and back binding band 8 may be adjusted relative to the supporting component. After the position adjustment of the front and back binding band 8 is completed, the rotating component does not contact with the induction part 5, and the induction part 5 stops sending signals to the executing part. The executing part that has not received the signal may not control the pressing plate 7 and the pressing cover 9 to move toward each other. The pressing plate 7 and the pressing cover 9 approach each other under the action of the clamping force, and then clamp the front and back binding band 8.

Figure 12:
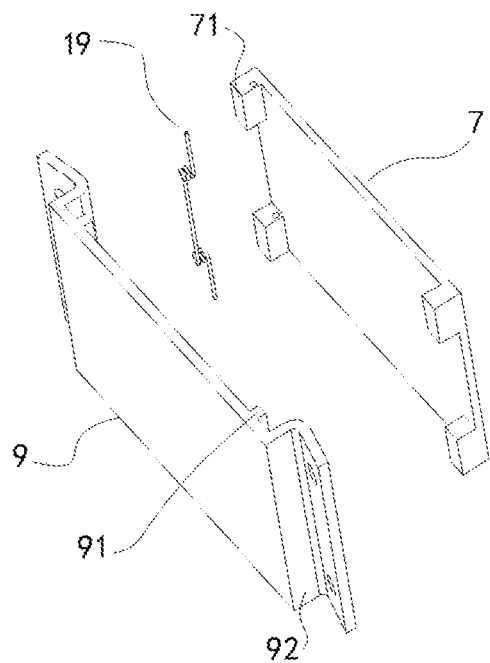
FIG. 12 is a schematic diagram of the structure of a pressing plate, a pressing cover and an elastic part in FIG. 4.
Figure 13:
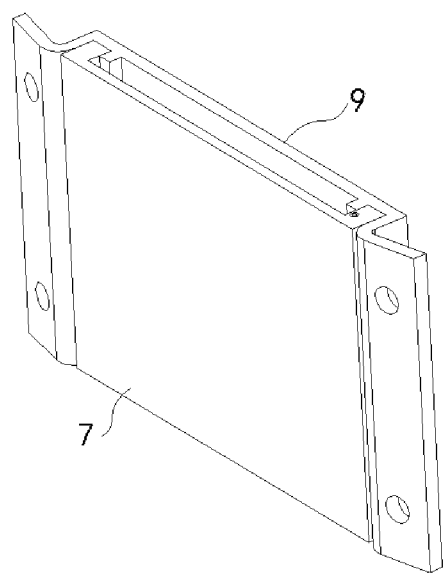
FIG. 13 is a schematic diagram of the pressing plate, the pressing cover and the elastic part in FIG. 12 after installation.

Referring to FIG. 12 and FIG. 13 of the specification, in order to realize the clamping force between the pressing plate 7 and the pressing cover 9, a spring 19 may also be provided, the spring 19 provides the clamping force to ensure that the pressing plate 7 and the pressing cover 9 clamp the front and back binding band 8. Specifically, fixing blocks 71 are arranged at four top corners of the pressing plate 7, hems 92 are arranged on both sides of the pressing cover 9, and two limiting ribs 91 are arranged between the two hems 92, and the limiting ribs 91 are in a continuous convex structure. A hem 92 and a limiting rib 91 form a set of limiting structures, and the pressing cover 9 has two sets of limiting structures, and each set of limiting structures accommodates two fixing blocks 71 in the vertical direction to realize the mounting of the pressing plate 7 and the pressing cover 9.

Referring to the orientation shown in FIG. 12 of the specification, the pressing cover 9 has two sets of left and right limiting structures, and the limiting structure on the right side is used to accommodate two fixing blocks 71 at the right end of the pressing plate 7; the limiting structure on the left side and the two fixing blocks 71 on the left end of the pressing plate 7 are connected with the spring 19, and the two fixing blocks 71 on the left end of the pressing plate 7 are provided with mounting holes for mounting upper and lower ends of the spring 19. There is also a clamping part located on the left side of the pressure cover 9, and the clamping part is located between the two fixing blocks 71 at the left end of the pressing plate 7 to restrict the up and down movement of the pressing plate 7 and the pressing cover 9; that is, after the pressing plate 7 and the pressing cover 9 are mounted, the limiting structure prevents the pressing plate 7 and the pressing cover 9 from moving left and right, and the clamping part and the two fixing blocks 71 are used to restrict the up and down movement of the pressing plate 7 and the pressing cover 9. The clamping part of the pressing cover 9 is provided with spring limiting holes penetrating the upper and lower ends, and the upper and lower ends of the spring 19 are respectively mounted on two fixing blocks 71. A middle section of the spring 19 is mounted in the spring limiting hole, and the pressing plate 7 and the pressing cover 9 are connected by the spring 19, and the spring 19 has elasticity, so that the pressing plate 7 and the pressing cover 9 keep the clamping force. Of course, regarding the setting method of maintaining the clamping force between the pressing plate 7 and the pressing cover 9, reference may also be made to the conventional technology, which is not repeated here.

Regarding the specific setting of the induction part 5 and the executing part, the following two specific implementations are given in this specification. The first type: referring to FIG. 4, FIG. 5 and FIG. 14 of the specification, the induction part 5 may be set as a pressure sensor. The executing part includes an electromagnet 6, and the pressing plate 7 is a metal pressing plate. The pressure sensor, the pressing cover 9 and the electromagnet 6 are fixed relative to the supporting component, and the electromagnet 6 is closer to the supporting component than to the pressing plate 7. The metal pressing plate may be attracted by the electromagnet 6, and the attracted metal pressing plate moves away from the pressing cover 9, thereby releasing the clamping of the front and back binding band 8.

If the binding band adjusting device is required to be worn on the head, the front and back binding band 8 is secured relative to the supporting component, and the pressing plate 7 and the pressing cover 9 clamp the front and back binding band 8 under the clamping force; if the position of the front and back binding band 8 relative to the supporting component needs to be adjusted, the rotating component moves in the axial direction of the through hole, and once the rotating component is in contact with the pressure sensor, the pressure sensor generates an electrical signal, the electrical signal may be transmitted to the electromagnet 6 through PCB and other circuit boards. The electromagnet 6 that gets the electrical signal is magnetic and generates attractive force. The metal pressing plate moves toward the electromagnet 6 under the action of the attractive force of the electromagnet 6, and the metal pressing plate overcomes the clamping force between the pressing plate 7 and the pressing cover 9 during the movement; apparently, the attractive force generated by the electromagnet 6 should be greater than the clamping force between the pressing plate 7 and the pressing cover 9; that is, the electromagnet 6, the pressing plate 7 and the pressing cover 9 are sequentially arranged in the direction away from the supporting component, and the pressing plate 7 is located between the electromagnet 6 and the pressing cover 9.

If the pressure sensor is not touched by the rotating component, the pressure sensor may not generate an electrical signal. The electromagnet 6 that has not received an electrical signal has no magnetism and may not generate attractive force. the metal pressing plate may not be attracted by the electromagnet 6, and the metal pressing plate moves towards the pressing cover 9 and away from the electromagnet 6 under the action of the clamping force, and the metal pressing plate and the pressing cover 9 clamp the front and back binding band 8; since the position of the pressing cover 9 is fixed relative to the supporting component, the metal pressing plate, the front and back binding band 8 and the pressing cover 9 are fixed relative to the supporting component.

Figure 15:
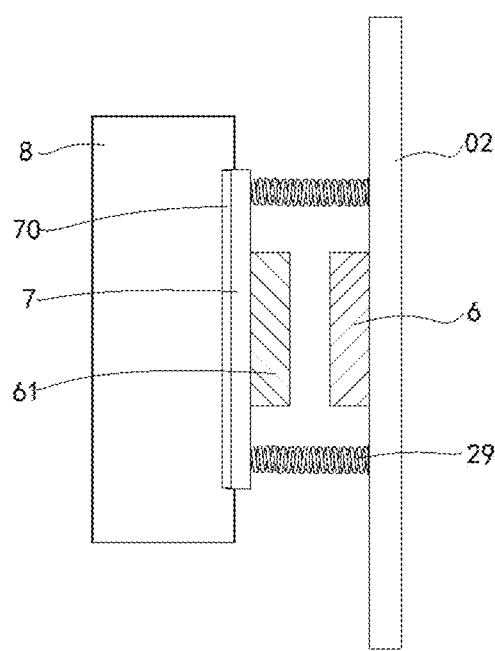
FIG. 15 is a schematic diagram of a second arrangement mode among the second bracket, the pressing plate and the electromagnet in FIG. 4.

The second type: referring to FIG. 4, FIG. 5 and FIG. 15 of the specification, the induction part 5 may be set as a pressure sensor, and the executing part includes an electromagnet 6 and a magnet 61. The pressing plate 7 is a plastic pressing plate, the position of the pressure sensor, the pressing cover 9 and the electromagnet 6 is fixed relative to the supporting component, and the magnet 61 may be fixedly arranged on the pressing plate 7 by means of screws, etc. The magnet 61 is farther away from the front and back binding band 8 than the pressing plate 7, and the magnet 61 is close to the electromagnet 6; the electromagnet 6 is closer to the supporting component than to the pressing plate 7. The magnet 61 may be attracted by the electromagnet 6, and the attracted magnet 61 drives the plastic pressing plate to move away from the pressing cover 9, thereby releasing the clamping of the front and back binding band 8.

Similarly to the above, if the binding band adjusting device is required to be worn on the head, the front and back binding band 8 are secured relative to the supporting component, and the pressing plate 7 and the pressing cover 9 clamp the front and back binding band 8 under the clamping force; if the position of the front and back binding band 8 relative to the supporting component needs to be adjusted, the rotating component moves in the axial direction of the through hole, and once the rotating component is in contact with the pressure sensor, the pressure sensor generates an electrical signal, the electrical signal may be transmitted to the electromagnet 6 through PCB and other circuit boards. The electromagnet 6 that gets the electrical signal is magnetic and generates attractive force. The magnet 61 moves towards the direction of the electromagnet 6 under the action of the attraction force of the electromagnet 6, and the magnet 61 is fixedly connected with the plastic pressing plate, and the both move synchronously, so that the clamping force between the pressing plate 7 and the pressing cover 9 is overcome during the movement; apparently, the attractive force generated by the electromagnet 6 should be greater than the clamping force between the pressing plate 7 and the pressing cover 9.

If the pressure sensor is not touched by the rotating component, the pressure sensor may not generate an electrical signal. The electromagnet 6 that has not received an electrical signal has no magnetism and may not generate attractive force. The magnet 61 is not attracted by the electromagnet 6, and the plastic pressing plate drives the magnet 61 to move towards the pressing cover 9 and away from the electromagnet 6, and the plastic pressing plate and the pressing cover 9 clamp the front and back binding band 8; since the position of the pressing cover 9 is fixed relative to the supporting component, the plastic pressing plate, the front and back binding band 8 and the pressing cover 9 are fixed relative to the supporting component.

In the above two specific embodiments, contact surfaces of the pressing plate 7 and the front and back binding band 8 may also be provided with a wear-resistant layer 70 to increase friction. The wear-resistant layer 70 may be specifically a film or a rough layer. Whether it is a metal pressing plate or a plastic pressing plate, the wear-resistant layer 70 may be integrally provided on the surface of the pressing plate 7, and the wear-resistant layer 70 may be determined according to the different materials of the pressing plate 7, which is not repeated here.

Referring to FIG. 5 of the specification, the pressure sensor may be set in a flat shape, the electromagnet 6 is in the shape of a ring, and the pressure sensor is located in the middle of the electromagnet 6, and the pressure sensor and the electromagnet 6 are fixed relative to the supporting component. The rotating component is movable relative to the supporting component, and as for the contact position between the rotating component and the pressure sensor and the setting mode of the contact position, it may be determined according to actual needs, and a specific setting mode is given below.

Referring to FIG. 4 to FIG. 7 of the specification, the knob 1 includes an annular body 10, a rotating shaft 11 and a mounting shaft 12, and the outer circumference of the annular body 10 may be provided with multiple contact grooves for be grasped by hands; the rotating shaft 11 is located at an inner side of the annular body 10 and perpendicular to the annular body 10. The rotating shaft 11 extends along an axial direction of the through hole, and may be regarded as a rotation center line of the knob 1.

The mounting shaft 12 is located at the inner side of the annular body 10 and perpendicular to the annular body 10, the mounting shaft 12 extends along the axial direction of the through hole, and the mounting shaft 12 is located outside the rotating shaft 11; the multiple mounting shafts 12 may be provided, which are distributed in the circumferential direction of the rotating shaft 11, and the rotating shaft 11 and the mounting shaft 12 may be integrally provided.

Figure 6:
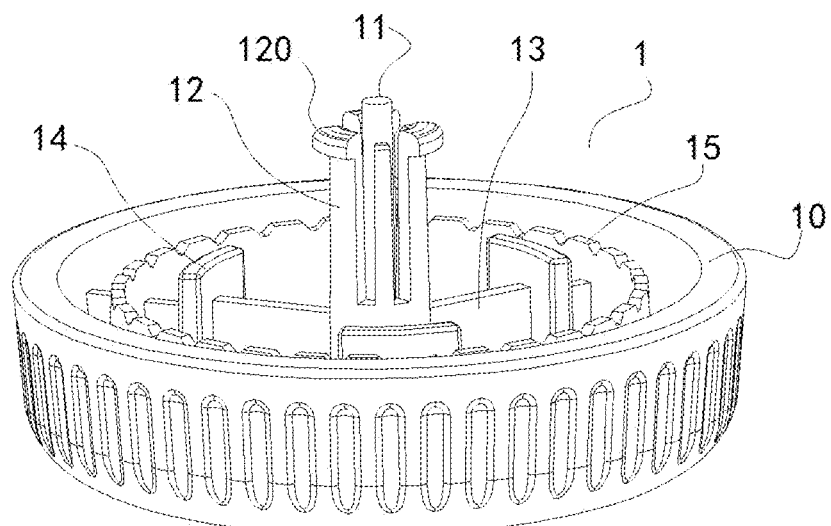
FIG. 6 is a schematic structural diagram of a knob in FIG. 4.
Figure 7:
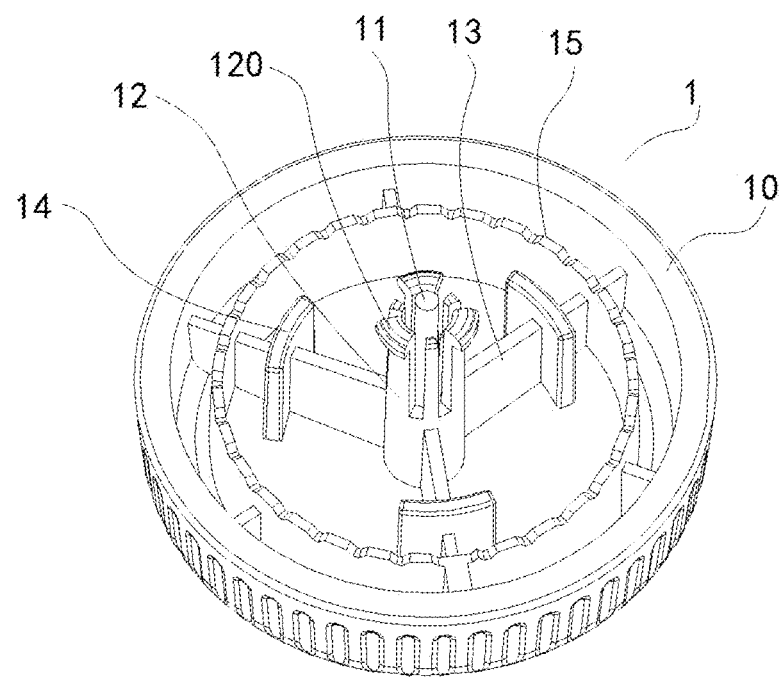
FIG. 7 is a schematic diagram of another angle of the knob in FIG. 6.

Viewed from the orientation shown in FIG. 6 and FIG. 7 of the specification, the bottom of each mounting shaft 12 is fixed to the rotating shaft 11, the top of the mounting shaft 12 is suspended, and the top of the mounting shaft 12 may be close to or far away from the rotating shaft 11. That is, the tops of the multiple mounting shafts 12 may be in a contracted or opened state relative to the rotating shaft 11; a claw 120 is provided on the top of the mounting shaft 12, and the claw 120 is used for clamping with the supporting component.

Strictly speaking, the top of the mounting shaft 12 is the end of the mounting shaft 12 close to the supporting component, and the end of the rotating shaft 11 close to the supporting component is used to contact the triggering component to realize the triggering of the triggering component; in combination with the above embodiments, the end of the rotating shaft 11 close to the supporting component is used to contact the pressure sensor. If the pressure sensor is triggered by the end, close to the supporting component, of the rotating shaft 11, the pressure sensor generates an electrical signal. The electrical signal may be transmitted to the electromagnet 6 through a circuit board such as a PCB to perform subsequent operations, which is not repeated here.

Figure 8:
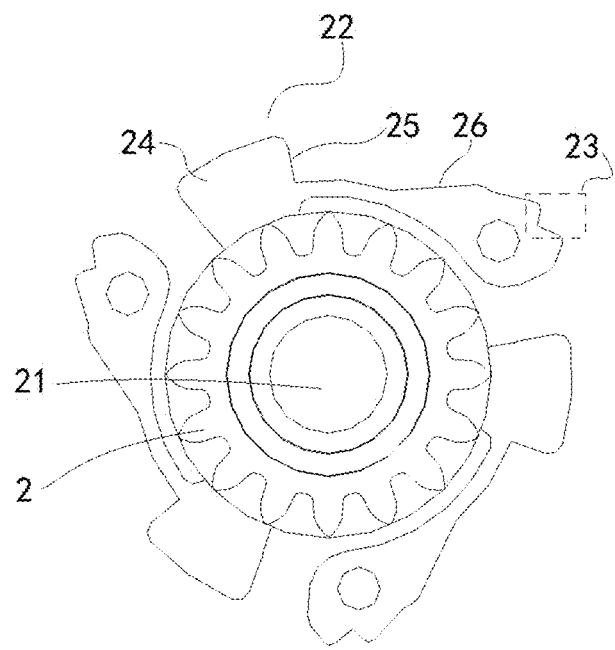
FIG. 8 is a schematic diagram of the structure of a gear and a clamping arm in FIG. 4.
Figure 9:
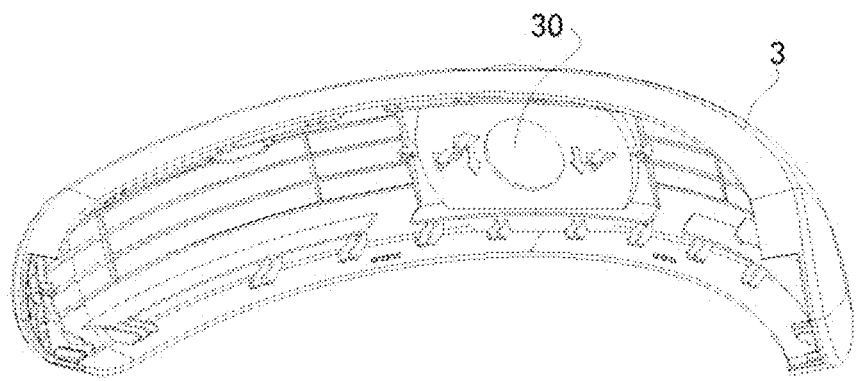
FIG. 9 is a schematic structural diagram of a back cover in FIG. 4.

Referring to FIG. 8 of the specification, the gear 2 is provided with a mounting through hole 21, and the mounting shaft 12 is mounted inside the mounting through hole 21 to realize the connection between the knob 1 and the gear 2; since the mounting shaft 12 has a certain degree of elasticity, the tops of the multiple mounting shafts 12 may be in a contracted or opened state relative to the rotating shaft 11. The outer side wall of the mounting shaft 12 abut against the inner wall of the mounting through hole 21 to limit the radial displacement of the gear 2 relative to the knob 1. Under the cooperation of the mounting shaft 12 and the mounting through hole 21, the gear 2 and the knob 1 may move synchronously along the axial direction of the through hole of the supporting component.

The claw 120 extends toward the outside, and the supporting component should be provided with a portion for the claw 120 to be clamped, which may be a clamping structure such as a clamping hole, so as to realize the position fixing of the knob 1 relative to the supporting component; of course, the claw 120 should not hinder the rotation and axial displacement of the knob 1 relative to the supporting component mentioned above; if there is no need to adjust the tightness of both sides and front and back of the head, the position of the knob 1 is fixed relative to the supporting component by the clamping of the claw 120 and the clamping structure, and the clamping structure may be arranged in many ways. Specific embodiments are given below.

Regarding the knob 1, referring to FIG. 6 and FIG. 7 of the specification, the knob 1 further includes a connecting arm 13, the connecting arm 13 is connected to the mounting shaft 12 and the annular body 10. The connecting arm 13 is provided with a circumferential stopper 14, and the gear 2 is fixedly provided with a clamping arm 22, the clamping arm 22 is used for cooperating with the circumferential stopper 14 to prevent the gear 2 from rotating relative to the knob 1.

Referring to FIG. 4 and FIG. 8 of the specification, the clamping arm 22 is arranged outside the circumference of the gear 2, and the clamping arm 22 and the gear 2 are arranged along an extending direction of the rotating shaft 11, and the gear 2 and the clamping arm 22 are fixedly connected and move synchronously. The gear 2 and the clamping arm 22 may be an integral structure. The clamping arm 22 includes a base body 24 and an extension arm 26, and the base body 24 and the extension arm 26 are integrally arranged, the extension arm 26 has elasticity, and one side, near the extension arm 26, of the base body 24 has a broken edge 25. The extension arm 26 gradually extends toward the outer side of the gear 2 in the direction away from the base body 24, and the extension arm 26 and the broken edge 25 form a clamping groove for placing the circumferential stopper 14. As shown in FIG. 7 and FIG. 8 of the specification, the extension arm 26 and the broken edge 25 are located in the circumferential direction of the mounting through hole 21; the broken edge 25 is located on the plane of the end face of the mounting through hole 21, and the broken edge 25 extends along the radial direction of the mounting through hole 21, the extension arm 26 is not parallel to the broken edge 25, and the extension arm 26 extends in the direction away from the broken edge 25 and is gradually inclined toward the direction away from the mounting through hole 21, the extension arm 26 and the broken edge 25 form two ends of the clamping groove, and the two side walls of the circumferential stopper 14 fit the extension arm 26 and the broken edge 25 respectively.

Figure 10:
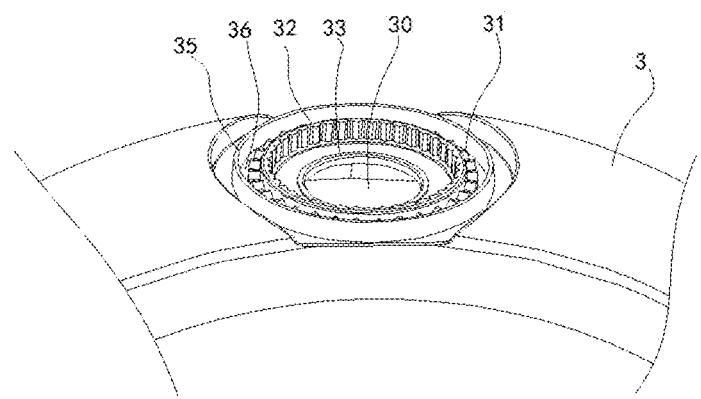
FIG. 10 is a schematic diagram of another angle at a via hole of a back cover in FIG. 9.

Referring to FIG. 8 of the specification, the clamping arm 22 is provided with a first matching part 23, the first matching part 23 is located at the end of the extension arm 26, the first matching part 23 is in the shape of a ratchet, and the supporting component is provided with a second matching part 32. As shown in FIG. 10 of the specification, the second matching part 32 is in the shape of a toothed ring. The first matching part 23 and the second matching part 32 may cooperate with each other; if there is no need to adjust the positional relationship between the two side binding bands 4 relative to the supporting component (that is, of there is no need to rotate the knob 1), the knob 1, the gear 2 and the clamping arm 22 should be stationary relative to the supporting component. The ratchet-shaped structure is used to cooperate with one tooth of the ring gear, so as to allow the first matching part 23 to be stationary relative to the second matching part 32.

Taking the orientation shown in FIG. 8 of the specification as an example, if the knob 1, the gear 2 and the clamping arm 22 rotate counterclockwise relative to the supporting component, it is necessary to hold the knob 1 and rotate the knob 1 counterclockwise. The circumferential stopper 14 of the knob 1 synchronously rotates counterclockwise, one side wall of the circumferential stopper 14 fits the broken edge 25, and both the gear 2 and the clamping arm 22 rotate synchronously with the knob 1.

If the clamping arm 22 rotates counterclockwise relative to the supporting component, the first matching part 23 continues to rub against the different teeth of the ring gear, that is, the first matching part 23 rotates relative to the second matching part 32, and during the rotation, the first matching part 23 is always in contact with the second matching part 32.

In addition, in the above process, due to the relative movement between the first matching part 23 and the second matching part 32, the first matching part 23 and the second matching part 32 continue to rub, and friction is generated, accompanied by sound generated during friction, thus the operator sense the current rotation of the knob 1, which is beneficial to accurate adjustment. With reference to FIG. 11 of the specification, if the knob 1, the gear 2 and the clamping arm 22 rotate counterclockwise relative to the supporting component, the two side binding bands 4 retract relative to the supporting component.

Taking the orientation shown in FIG. 8 of the specification as an example, if the knob 1 is rotated clockwise, since the extension arm 26 is not parallel to the broken edge 25, the extension arm 26 extends in the direction away from the broken edge 25 is gradually inclined toward the direction away from the mounting through hole 21, and the extension arm 26 has elasticity; if the knob 1 is rotated clockwise, the side wall, fitting the extension arm 26, of the circumferential stopper 14 and acts on the extension arm 26, so that the extension arm 26 moves towards the gear 2, and the first matching part 23 gradually separates from the second matching part 32. There is no friction between the first mating part 23 and the second mating part 32, the side wall of the circumferential stopper 14 is out of contact with the broken edge 25, and the other side wall of the circumferential stopper 14 still fit the extension arm 26 (although the extension arm 26 moves towards the gear 2). The first matching part 23 is separated from the second matching part 32, and the knob 1 may drive the clamping arm 22 to rotate clockwise relative to the supporting component of the knob 1. With reference to FIG. 11 of the specification, when the knob 1, the gear 2 and the clamping arm 22 rotate clockwise relative to the supporting component, the two side binding bands 4 extend relative to the supporting component.

It can be seen that the two side binding bands 4 may be simultaneously extended or retracted relative to the supporting component by rotating the knob 1 in different directions relative to the supporting component; after the adjustment of the two side binding bands 4 is completed, the extension arm 26 moves in a direction away from the gear 2 under the action of elasticity. The first matching part 23 is clamped to the second matching part 32 to realize the position fixing of the gear 2 and the supporting component, and to ensure the two side binding bands 4 to be in the current position relative to the supporting component. With reference to FIG. 6 and FIG. 7 of the specification, the knob 1 further includes a first annular part 15, the first annular part 15 is located on the inner side of the annular body 10, and the first annular part 15 is wavy; the supporting component is provided with a second annular part 31, as shown in FIG. 10 of the specification, the second annular part 31 is concave and convex. The first annular part 15 and the second annular part 31 may be engaged with each other. There is no contact between the first annular part 15 and the second annular part 31 of the tightness of both sides of the head does not need to be adjusted (that is, if the knob 1 does not need to be rotated); if the tightness of both sides of the head needs to be adjusted (that is, if the knob 1 needs to be rotated), the knob 1 is rotated, and there is still no contact between the first annular part 15 and the second annular part 31. If the tightness of the head needs to be adjusted (if the knob 1 needs to be pressed down), the knob 1 moves along the axial direction of the through hole. If the first annular part 15 and the second annular part 31 are in contact, they are locked, and the first annular part 15 and the second annular part 31 may not rotate relative to each other, that is, the tightness on both sides of the head may not be adjusted. The rotating shaft 11 triggers the pressure sensor, and after the pressure sensor is triggered by one end, close to the supporting component, of the rotating shaft 11, the pressure sensor generates an electrical signal, the electrical signal may be transmitted to the electromagnet 6 through PCB and other circuit boards to perform subsequent operations.

Referring to FIG. 10 of the specification, the supporting component is provided with a retaining ring 33, the retaining ring 33 is located in the circumferential direction of the through hole, the second annular part 31 and the second matching part 32 are located on the side, away from the side binding band 4, of the retaining ring 33, and the gear 2 is located on the side, close to the side binding band 4, of the retaining ring 33; that is, the first annular part 15 of the knob 1 is located on the side, away from the side binding band 4, of the retaining ring 33, and the clamping arm 22 is also located on the side, away from the side binding band 4, of the retaining ring 33; the rotating shaft 11 and the mounting shaft 12 of the knob 1 penetrate the through hole of the supporting component, and the gear 2 also penetrates the through hole of the supporting component. Since the clamping arm 22 is located outside the gear 2, an end surface of the clamping arm 22 fits the retaining ring 33, and the retaining ring 33 may limit the axial position of the gear 2 and the clamping arm 22.

Regarding the supporting component, referring to FIG. 4 of the specification, it includes the first bracket 01, the second bracket 02 and the back cover 3. The first bracket 01 and the back cover 3 are connected to form an accommodating cavity, and the accommodating cavity accommodates the side binding band 4, as shown in FIG. 11 of the specification. The first bracket 01, the second bracket 02 and the back cover 3 may be connected by bolts in the conventional technology to realize the fixation of the three.

The back cover 3 is provided with a back cover via hole 30, and the back cover via hole 30 is a part of the through hole of the supporting component. The second annular part 31, the second matching part 32 and the retaining ring 33 are provided on the back cover 3, the rotating shaft 11 and the mounting shaft 12 of the knob 1 pass through the back cover via hole 30, and the gear 2 also passes through the back cover via hole 30; the two side binding bands 4 mesh with the gear 2, and the two side binding bands 4 and the clamping arm 22 are respectively located on different sides of the back cover 3.

The second bracket 02 is mounted on the first bracket 01, and the second bracket 02 is provided with a triggering component. The first bracket 01 and the second bracket 02 each have a bracket via hole, and the back cover via hole 30 and the two bracket through holes form the through hole for the supporting component. The pressure sensor is arranged at the bracket via hole of the second bracket 02, and the pressure sensor and the electromagnet 6 are fixed on the side, close to the front and back binding band 8, of the second bracket 02.

Referring to FIG. 5 and FIG. 11 of the specification, it may be seen that the rotating shaft 11 of the knob 1 sequentially penetrates the back cover via hole 30, the mounting through hole 21 of the gear 2 and the bracket via hole of the first bracket 01. In addition, the rotating shaft 11 may touch the pressure sensor located at the through hole of the second bracket 02 during the movement along the axial direction of the through hole, so as to realize the above-mentioned function.

Referring to FIG. 5 and FIG. 7 of the specification, the length of the rotating shaft 11 is greater than the length of the claw 120; if the knob 1 is mounted on the back cover 3, the rotating shaft 11 is closer to the front and back binding band 8 than to the claw 120, so that the rotating shaft 11 may touch the pressure sensor while the knob 1 does not need to move a large distance. The claw 120 is used to clamp the bracket via hole of the first bracket 01. Herein, the bracket via hole of the first bracket 01 is the clamping structure of the supporting component described above.

During the installation process, the claw 120 sequentially penetrates through the back cover via hole 30 and the mounting through hole 21 of the gear 2. If it is necessary to penetrate the via hole of the first bracket 01, the claw 120 moves towards the rotating shaft 11, that is, the claw 120 retracts relative to the rotating shaft 11, so that the claw 120 penetrates the bracket via hole of the first bracket 01. If the claw 120 penetrates through the bracket via hole of the first bracket 01, it returns to its original shape under the elastic action of the claw 120. The claw 120 clamps the bracket via hole of the first bracket 01, and the knob 1 is secured to the first bracket 01.

In FIG. 5 of the specification, the knob 1 is in a pressed state, and the pressing plate 7 has not been out of contact with the front and back binding band 8. It may be seen that the rotating shaft 11 of the knob 1 touches the induction part 5 (pressure sensor), and the claw 120 is disengaged from the first bracket 01, the claw 120 does not clamp the first bracket 01, and the claw 120 is closer to the front and back binding band 8 than to the first bracket 01.

Figure 14:
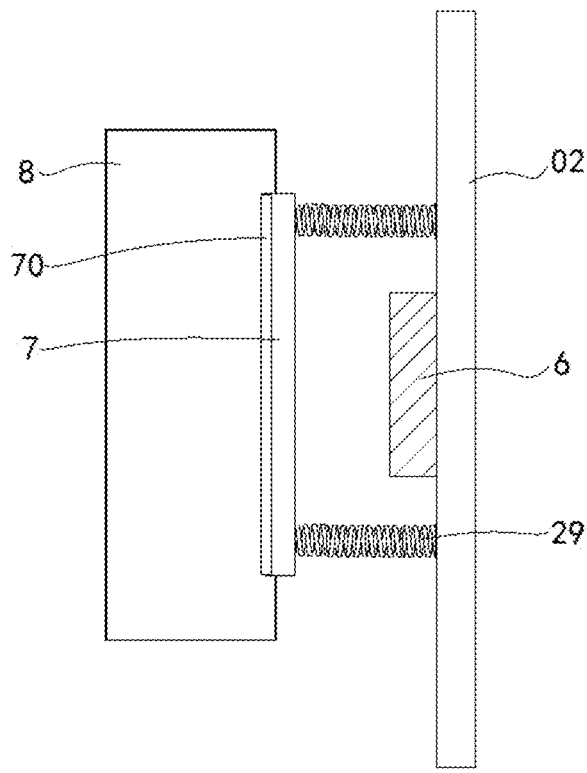
FIG. 14 is a schematic diagram of a first arrangement mode among a second bracket, the pressing plate and the electromagnet in FIG. 4.

Referring to FIG. 14 and FIG. 15 of the specification, there is an elastic part 29 between the second bracket 02 and the pressing plate 7 for the pressing plate 7 and the pressing cover 9 to maintain the clamping force. As described above, if the position of the front and back binding band 8 relative to the supporting component needs to be adjusted, the rotating shaft 11 of the knob 1 touches the induction part 5 (pressure sensor), and the pressure sensor generates an electrical signal. The electrical signal may be transmitted to the electromagnet 6 through PCB and other circuit boards. The electromagnet 6 that gets the electrical signal is magnetic and generates attractive force. Whether the metal pressing plate or the magnet 61 moves in the direction of the electromagnet 6 under the action of attractive force, it is necessary to overcome the clamping force between the pressing plate 7 and the pressing cover 9 and the elastic force of the elastic part 29 at the same time. Thus, it realizes the movement of the pressing plate 7 towards the second bracket 02 and realizes the release of the front and back binding band 8.

If the pressure sensor is not touched by the rotating shaft 11, the pressure sensor may not generate an electrical signal. The electromagnet 6 that has not received an electrical signal has no magnetism and may not generate attractive force. The metal pressing plate or magnet 61 that is not attracted by the electromagnet 6 may not be attracted by the attraction force, and the pressing plate 7 may not move away from the second bracket 02 under the action of elastic part 29, thereby realizing the position fixing of the pressing plate 7, the front and back binding band 8 and the pressing cover 9 relative to the supporting component. The elastic part 29 may be a spring or other components, which is not repeated here.

Referring to FIG. 4 and FIG. 10 of the specification, the second annular part 31 is provided with an elastic washer 34 in the circumferential direction, and the elastic washer 34 is located between the annular body 10 and the supporting component. Specifically, the back cover 3 is provided with an enclosure 35, the enclosure 35 is located on the outer periphery of the second annular part 31, and there is a groove 36 between the enclosure 35 and the second annular part 31, and the elastic washer 34 is arranged in the groove 36. Under the action of the enclosure 35, the elastic washer 34 is fixed in position relative to the second annular part 31. Apparently, when the elastic washer 34 is mounted in the groove 36, the height of the elastic washer 34 should be higher than the height of the enclosure 35, and the upper end face of the elastic washer 34 abuts against the annular body 10 of the knob 1. That is, the relative positional relationship between the knob 1 and the back cover 3 is maintained by the elastic washer 34. If the knob 1 needs to be pressed to adjust the position of the front and back binding band 8 relative to the supporting component, the elastic force of the elastic washer 34 should be overcome, and the first annular part 15 and the second annular part 31 abut against each other, so that the knob 1 may not rotate relative to the back cover 3. If the adjustment is completed, that pressing the knob 1 is stopped, and the knob 1 moves in a direction away from the back cover 3 under the action of the elastic washer 34 to realize an automatic return of the knob 1.

Referring to FIG. 4 of the specification, a limit washer 03 may also be provided between the first bracket 01 and the second bracket 02, and the limit washer 03 is used to fix a relative position between the first bracket 01 and the second bracket 02. As described above, If the knob 1 is pressed, the rotating shaft 11 of the knob 1 touches the induction part 5 (pressure sensor), and the claw 120 is disengaged from the first bracket 01, the claw 120 is not engaged with the first bracket 01. At the moment when the claw 120 is separated from the first bracket 01, the force of the first bracket 01 changes, and the limit washer 03 is arranged between the first bracket 01 and the second bracket 02, which may alleviate the local deformation and displacement caused by the force change of the first bracket 01, which ensures the structural reliability of the supporting component.

The binding band adjusting device may further include an elastic layer 04, the elastic layer 04 is connected to the back cover 3 to accommodate the first bracket 01, the second bracket 02 and the triggering component. Simply put, the elastic layer 04 is in contact with the head. In order to relieve the pressure on the head, the elastic layer 04 covers the first bracket 01, the second bracket 02 and the triggering component, which prevents hard objects from directly contacting the head and improves the user experience. The elastic layer 04 may be set as a flexible material layer such as a fabric layer or a sponge layer.

A head-worn display device provided with a binding band adjusting device according to the present application includes the binding band adjusting device described in the above specific embodiment; as mentioned above, the binding band adjusting device may be worn on the head, and then the head-worn display device may be worn on the head. Other parts of the head-worn display device may refer to the conventional technology and is not expanded here.

It should be noted that, relationship terms herein such as first and second are merely used to distinguish an entity from other entities and do not require or imply that there are any such actual relationships or sequences between these entities.

The head-worn display device and binding band adjusting device thereof provided by the present application have been described in detail above. Specific examples are used in this specification to illustrate the principle and implementation of the present disclosure. The description of the above embodiments is only used to facilitate understanding of the method and core concept of the present disclosure. It should be pointed out that, various improvements and modifications can be made by those skilled in the art without departing from the principle of the present disclosure, and these improvements and modifications should fall within the protection scope of the present disclosure.

The invention claimed is:

1. A binding band adjusting device, comprising:
a supporting component provided with a through hole,
a rotating component matched with the through hole,
two side binding bands connected with the rotating component;
a triggering component arranged on the supporting component for being triggered by the rotating component; and
a front and back binding band which is securable relative to the triggering component,
wherein: if the rotating component rotates in different directions relative to the through hole, the two side binding bands extend or retract relative to the supporting component; and
if the rotating component moves in an axial direction of the through hole and triggers the triggering component, the triggering component loosens or clamps the front and back binding band.

2. The binding band adjusting device according to claim 1, wherein the triggering component comprises:
an induction part for contacting with the rotating component;
a fitting part for tightly fitting the front and back binding band to clamp the front and back binding band; and
an executing part connected with the induction part and the fitting part, which is used for controlling the fitting part to loosen or clamp the front and back binding band after the induction part is triggered by the rotating component.

3. The binding band adjusting device according to claim 2, wherein:
the fitting part comprises a pressing plate close to the supporting component and a pressing cover far away from the supporting component;
one end of the front and back binding band is located between the pressing plate and the pressing cover; and
a clamping force is provided between the pressing plate and the pressing cover for clamping the front and back binding band.

4. The binding band adjusting device according to claim 3, wherein:
the induction part is a pressure sensor, the executing part comprises an electromagnet, and the pressing plate is a metal pressing plate which is attractable by the electromagnet to loosen the front and back binding band; and
if the pressure sensor receives the pressure of the rotating component, the pressure sensor sends out a pressure signal to allow the electromagnet to generate magnetism, the metal pressing plate is attracted by the electromagnet and moves towards the electromagnet, and the metal pressing plate loosens the front and back binding band.

5. The binding band adjusting device according to claim 4, wherein:
the rotating component comprises a knob and a gear for rotating under the rotation of the knob, and the two side binding bands are provided with teeth for meshing with the gear; and
if the knob is rotated in different directions, the two side binding bands and the gear move synchronously, and the two side binding bands extend or retract relative to the supporting component.

6. The binding band adjusting device according to claim 3, wherein:
the induction part is a pressure sensor, the executing part comprises an electromagnet and a magnet which is attractable by the electromagnet, the pressing plate is a plastic pressing plate, and the magnet is provided on the plastic pressing plate; and
if the pressure sensor receives the pressure of the rotating component, the pressure sensor sends out a pressure signal to allow the electromagnet to generate magnetism, the magnet is attracted by the electromagnet, both the magnet and the plastic pressing plate move towards the electromagnet, and the metal pressing plate loosens the front and back binding band.

7. The binding band adjusting device according to claim 3, wherein:
the rotating component comprises a knob and a gear for rotating under the rotation of the knob, and the two side binding bands are provided with teeth for meshing with the gear; and
if the knob is rotated in different directions, the two side binding bands and the gear move synchronously, and the two side binding bands extend or retract relative to the supporting component.

8. The binding band adjusting device according to claim 2, wherein:
the rotating component comprises a knob and a gear for rotating under the rotation of the knob, and the two side binding bands are provided with teeth for meshing with the gear; and if the knob is rotated in different directions, the two side binding bands and the gear move synchronously, and the two side binding bands extend or retract relative to the supporting component.

9. The binding band adjusting device according to claim 1, wherein:
the rotating component comprises a knob and a gear for rotating under the rotation of the knob, and the two side binding bands are provided with teeth for meshing with the gear; and
if the knob is rotated in different directions, the two side binding bands and the gear move synchronously, and the two side binding bands extend or retract relative to the supporting component.

10. The binding band adjusting device according to claim 9, wherein:
the knob comprises an annular body, a rotating shaft and a mounting shaft which are arranged inside the annular body and extend along an axial direction of the through hole, one end, close to the supporting component, of the rotating shaft is used for triggering the triggering component, the mounting shaft is arranged outside the circumference of the rotating shaft, and one end, close to the supporting component, of the mounting shaft is provided with a claw for clamping the supporting component; and
the gear is provided with a mounting through hole for mounting the mounting shaft.

11. The binding band adjusting device according to claim 10, wherein:
the knob further comprises a circumferential stopper arranged between the mounting shaft and the annular body; and
an end face, far away from the front and back binding band, of the gear is fixedly provided with a clamping arm which is matched with the circumferential stopper, so as to drive the gear to rotate under the rotating action of the knob.

12. The binding band adjusting device according to claim 11, wherein:
the clamping arm is provided with a first matching part, the supporting component is provided with a second matching part for matching with the first matching part, and the first matching part is rotatable unidirectionally relative to the second matching part;
if the knob drives the gear to rotate in a first direction, friction is generated between the first matching part and the second matching part; and
if the knob drives the gear to rotate in a second direction, the first matching part and the second matching part are out of contact.

13. The binding band adjusting device according to claim 11, wherein:
the knob further comprises a first annular part arranged inside the annular body; and
the supporting component is provided with a second annular part matched with the first annular part, so that if the rotating shaft triggers the triggering component, the first annular part and the second annular part are matched with each other to prevent the knob from rotating relative to the supporting component.

14. The binding band adjusting device according to claim 13, wherein:
the supporting component is provided with a retaining ring located in a circumferential direction of the through hole;
the second annular part and the second matching part are located at one side, away from the two side binding bands, of the retaining ring; and the gear is located at one side, near the two side binding bands, of the retaining ring.

15. The binding band adjusting device according to claim 14, wherein:
the supporting component comprises a back cover, a first bracket connected with the back cover to form an accommodating cavity for accommodating the two side binding bands, and a second bracket connected with the first bracket for mounting the triggering component;
the back cover is provided with a second annular part, a second matching part and a retaining ring; and
the back cover, the first bracket and the second bracket are provided with via holes for forming the through hole.

16. The binding band adjusting device according to claim 15, wherein:
the rotating shaft is longer than the claw; and
the claw is used to clamp the via hole of the first bracket.

17. The binding band adjusting device according to claim 15, wherein:
an elastic washer is provided in a circumferential direction of the second annular part; and the elastic washer is located between the annular body and the supporting component.

18. The binding band adjusting device according to claim 15, further comprising a limit washer arranged between the first bracket and the second bracket and used for fixing the relative positions of the first bracket and the second bracket.

19. The binding band adjusting device according to claim 15, further comprising an elastic layer arranged on the back cover and used for accommodating the first bracket, the second bracket and the triggering component.

20. A head-worn display device, comprising a binding band adjusting device according to claim 1.

* * * * *